United States Patent
Hernandez

(10) Patent No.: US 7,865,483 B2
(45) Date of Patent: Jan. 4, 2011

(54) DEVICE MANAGEMENT SYSTEM AND METHOD FOR MANAGING DEVICE MANAGEMENT OBJECT

(75) Inventor: Pablo Hernandez, Paris (FR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 12/065,518

(22) PCT Filed: Sep. 20, 2006

(86) PCT No.: PCT/KR2006/003727
§ 371 (c)(1),
(2), (4) Date: Mar. 3, 2008

(87) PCT Pub. No.: WO2007/035036
PCT Pub. Date: Mar. 29, 2007

(65) Prior Publication Data
US 2008/0208928 A1     Aug. 28, 2008

(30) Foreign Application Priority Data
Jul. 27, 2006 (KR) ............ 10-2006-0071041

(51) Int. Cl.
*G06F 7/00* (2006.01)
*G06F 13/12* (2006.01)
(52) U.S. Cl. ..................... 707/694; 710/69

(58) Field of Classification Search ............ None
See application file for complete search history.

(56) References Cited

U.S. PATENT DOCUMENTS

| 6,584,499 | B1 | 6/2003 | Jantz et al. |
| 2005/0055397 | A1 | 3/2005 | Zhu et al. |
| 2008/0045346 | A1* | 2/2008 | Nelson et al. ............... 463/42 |
| 2010/0011095 | A1* | 1/2010 | Takamoto et al. .......... 709/220 |

FOREIGN PATENT DOCUMENTS

| JP | 2005-209145 A | 8/2005 |
| KR | 2000-0052929 A | 8/2000 |
| KR | 10-2001-0088529 A | 9/2001 |

\* cited by examiner

*Primary Examiner*—Neveen Abel Jalil
*Assistant Examiner*—Tarek Chbouki
(74) *Attorney, Agent, or Firm*—Birch, Stewart, Kolasch & Birch, LLP

(57) ABSTRACT

A device management (DM) system and a method for managing a DM object are disclosed. The DM system includes a server for determining whether to copy a DM object within a terminal to an external storage device and transmitting a command for copying the DM object according to the determining result, and the terminal having a first module for receiving the DM object copying command from the server and a second module for copying the DM object to the external storage device within the terminal in response to the received command.

6 Claims, 3 Drawing Sheets

[Fig. 1]
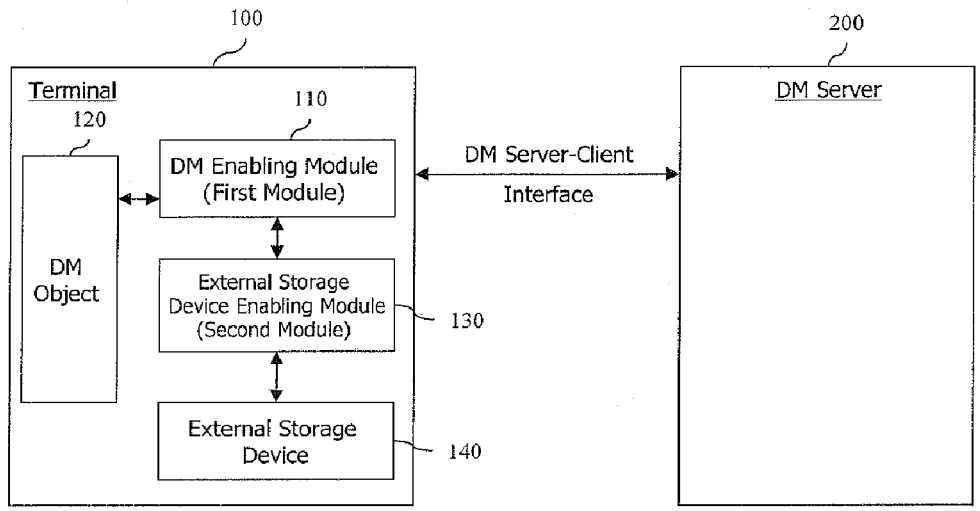
[Fig. 2]
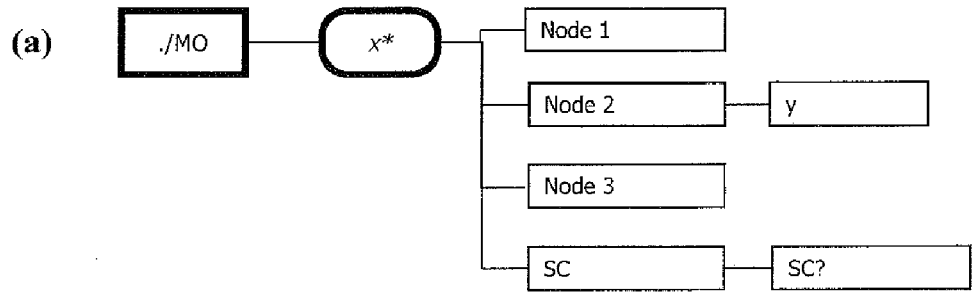
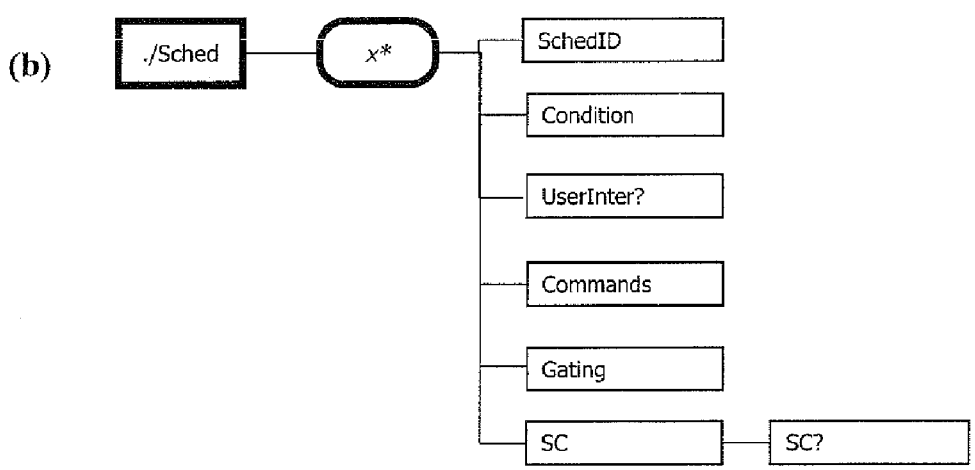

[Fig. 3]
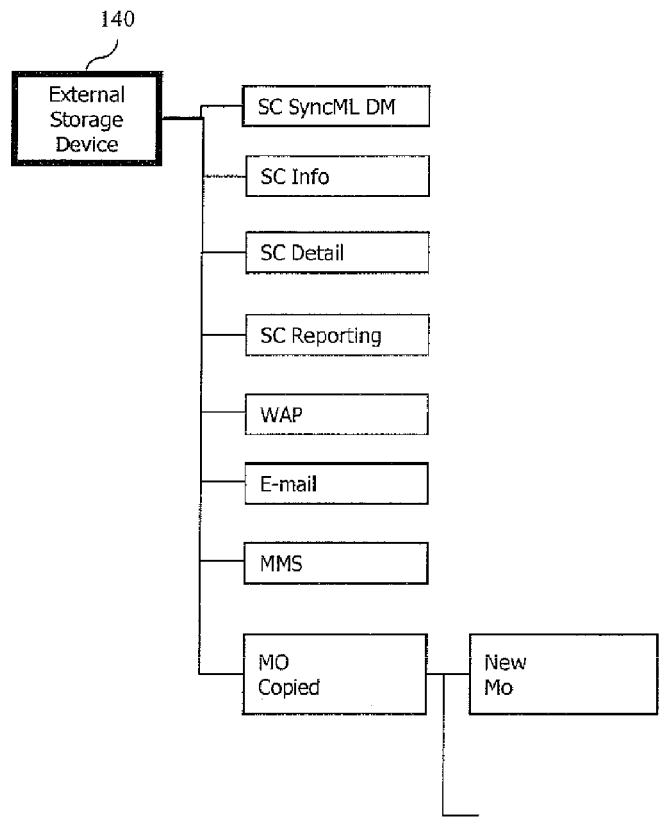
[Fig. 4]
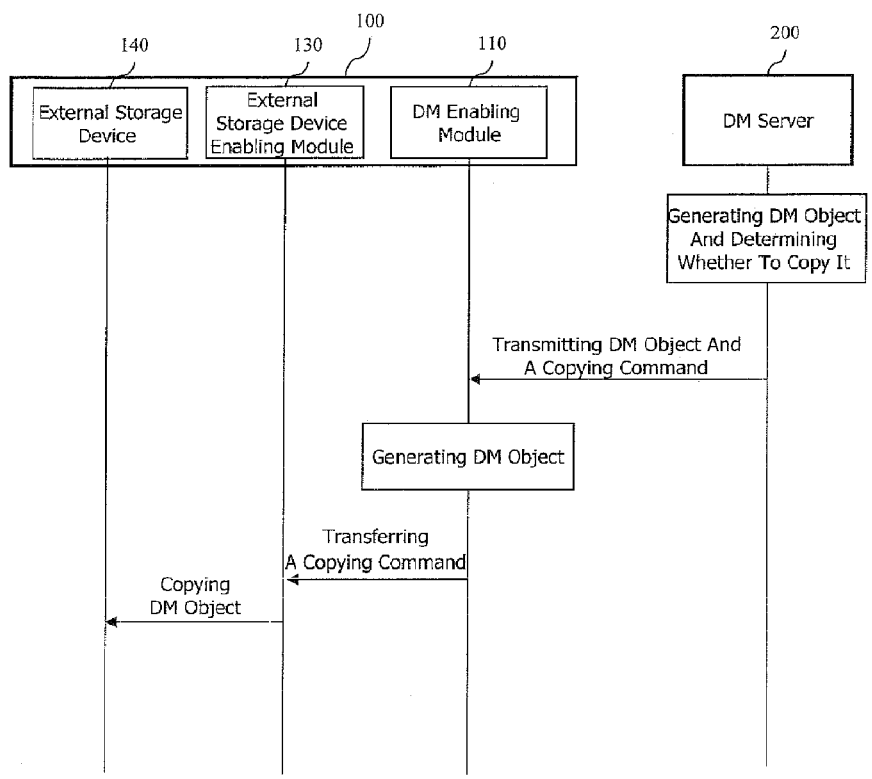

[Fig. 5]
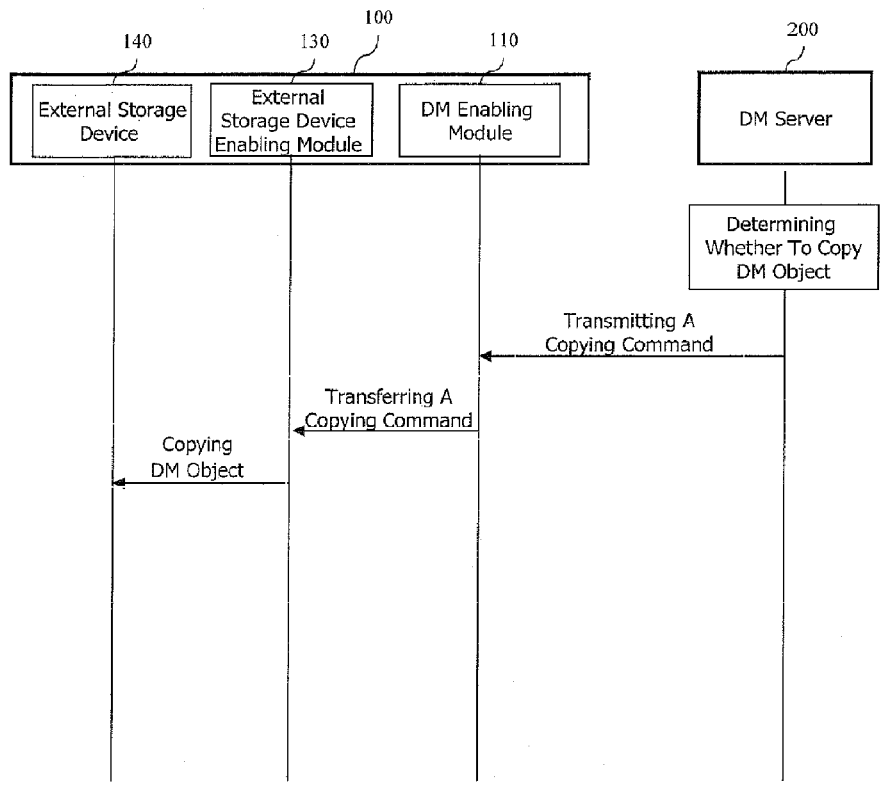
[Fig. 6]
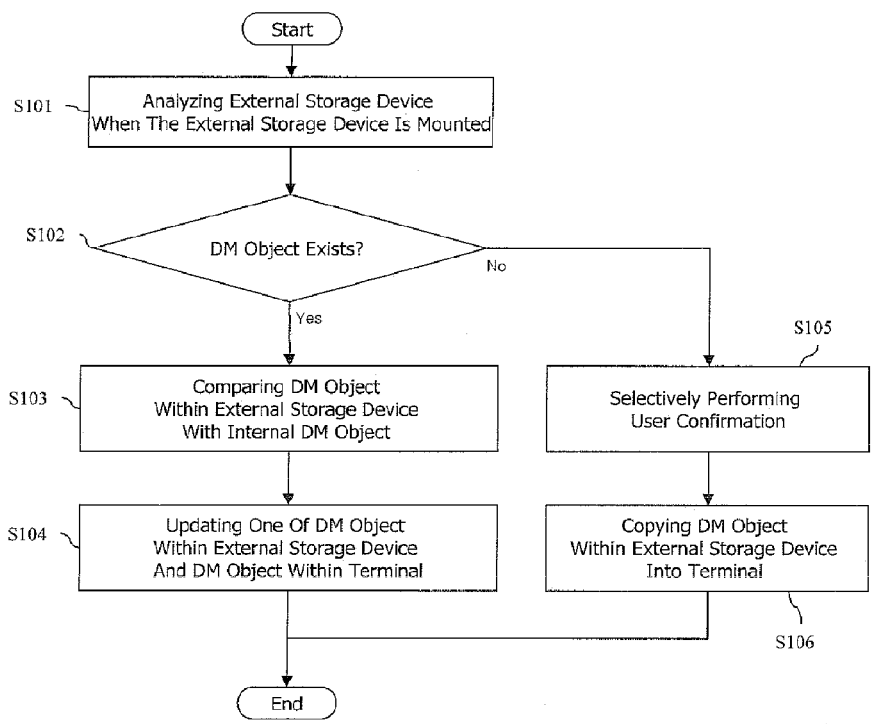

DEVICE MANAGEMENT SYSTEM AND METHOD FOR MANAGING DEVICE MANAGEMENT OBJECT

TECHNICAL FIELD

The present invention relates to a device management (DM) system and a method for managing a DM object and, more particularly, to a DM system and a method for managing a DM object capable of copying (duplicating) a DM object of a terminal to an external storage device.

BACKGROUND ART

In general, a DM technique is a technique for showing resources of a terminal (client) in the form of a DM object existing in a DM tree to a DM server to allow the DM server to access the resources and easily manage the terminal.

In the DM technique, the DM server can instruct the terminal to process a command for a DM, and the terminal can immediately perform the corresponding command and report on the performing result. In addition, the DM server can request changing/updating/deleting of a particular function from the terminal.

DISCLOSURE OF INVENTION

Technical Problem

However, in the DM technique, when the DM object of the terminal is damaged or when a user changes a terminal, the user should newly perform the DM operation which has been proceeding again in the same manner. In addition, the damage of the DM object causes user inconvenience.

Technical Solution

One exemplary feature of the present invention is to provide a DM system and a method for managing a device management (DM) object in a terminal capable of copying (duplicating) a DM object of a terminal to an external storage device.

To implement at least the above feature in whole or in parts, the present invention provides a method for managing a DM object that may include: receiving a DM object copying command from a server; and copying the DM object of the terminal to an external storage device in response to the received command.

To implement at least the above feature in whole or in parts, the present invention also provides a method for managing a DM object that may include: analyzing a DM object of an external storage device when the external storage device is mounted in a terminal; checking whether a DM object exists in the terminal; selectively performing user confirmation when a DM object has not been stored in the terminal; and copying the DM object of the external storage device to the terminal according to the user confirmation.

To implement at least the above feature in whole or in parts, the present invention also provides a method for managing a DM object that may include: determining by a server whether to copy a DM object in a terminal to an external storage device; transmitting a command for copying the DM object according to determining of the server; and copying by the terminal the DM object to the external storage device in response to the received command.

To implement at least the above feature in whole or in parts, the present invention also provides a terminal that may include: a first module for receiving a DM object copying command from a server; and a second module for copying a DM object in the terminal to an external storage device.

To implement at least the above feature in whole or in parts, the present invention also provides a system that may include: a server for determining whether to copy a DM object in a terminal to an external storage device and transmitting a command for copying the DM object according to the determining; a first module for receiving the DM object copying command from the server; and a second module for copying the DM object in the terminal to the external storage device in response to the received command.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 is a schematic block diagram showing the construction of a device management (DM) terminal and a server according to the present invention;

FIGS. 2A and 2B are exemplary views showing a DM object of a DM terminal of FIG. 1 in a tree structure;

FIG. 3 is an exemplary view showing an external storage device of FIG. 1 in a tree structure;

FIG. 4 is one exemplary view showing an operation of the terminal and the server in FIG. 1;

FIG. 5 is another exemplary view showing the operation of the terminal and the server in FIG. 1; and FIG. 6 is a flow chart illustrating the processes of a method for managing a DM object according to the present invention.

MODE FOR THE INVENTION

The exemplary embodiments of the present invention will now be described in detail. In describing the present invention, if a detailed explanation for a related known function or construction is considered to unnecessarily divert the gist of the present invention, such explanation has been omitted but would be understood by those skilled in the art. In addition, the same reference numerals are given to elements that perform the same function.

FIG. 1 is a schematic block diagram showing the construction of a device management (DM) terminal and a server according to the present invention, FIGS. 2A and 2B are exemplary views showing a DM object of a DM terminal of FIG. 1 in a tree structure, and FIG. 3 is an exemplary view showing an external storage device of FIG. 1 in a tree structure.

With reference to FIG. 1, a DM system according to the present invention includes a DM terminal 100 and a DM server 200.

The DM terminal 100 may include a DM enabling module 110, a DM object 120, an external storage device enabling module 130 and an external storage device 400.

The DM enabling module (or a first module) 110 handles setting of the terminal 100 by the server 200 and a user and managing of the DM object 120.

The DM enabling module 110 is connected with the server 200 through a DM server-client interface, according to which the server 200 can access the DM object 120 through the DM enabling module 110 and the DM enabling module 110 can receive a command for managing the DM object 120, e.g., a command regarding generation, correction or deletion, from the server 200 and execute it.

The operation of the DM enabling module 110 can be scheduled by the server 200. For this purpose, the server 200 can transmit a DM command and a schedule for performing the DM command to the terminal 100. In this case, the DM enabling module periodically checks whether the performing schedule is matched, and when the performing schedule is matched, the DM enabling module 110 performs the DM command to manage the DM object.

Meanwhile, the DM enabling module 110 handles setting of initial setting information in the terminal 100 by the server, updating of persistent information by the server 200, searching of management information and processing of an event and alarm generated from the terminal 100.

The DM object 120 relates to resources in the terminal 100 and includes hardware, a driver for enabling the hardware, and software. In addition, the DM object 120 includes a schedule for performing a DM command to manage a particular DM object according to certain conditions.

As shown in FIGS. 2A and 2B, the DM object 120 can be provided in the tree form to the server 200. First, the exemplary tree of the DM object as shown in FIG. 2A includes nodes with respect to particular resources in the terminal 100, namely, Node 1, Node 2, Node 3 and an SC (Smart Card) node. In this case, the SC node indicates whether the DM object is to be copied into the external storage device 140. Herein, if node is instructed to copy the DM object, the external storage device enabling module 130 copes the DM object to the external storage device 140 (to be described).

In case where the DM object 120 is updated due to some reasons later, if the SC node has been instructed to copy the DM object, the external storage device enabling module 130 should update a copy (duplicate) of the DM object which has been copied into the external storage device 140.

With reference to FIG. 2B, the exemplary tree of the DM schedule includes ShedID node for indicating an ID of a schedule, a condition node for indicating conditions for performing a DM command, a UserInter Node for indicating user confirmation, a commands node for indicating a DM command, a Gating node for indicating reporting to the server 200, and an SC node. Herein, the SC node indicates whether to copy the DM schedule into the external storage device 140.

The external storage device enabling module (or a second module) 130 manages the external storage device 140 and handles copying of the DM object 120 in the terminal 100.

The external storage device enabling module 130 can copy the DM object 120 to the external storage device 140 according to a command from the server 200 or the user or manage a copy of the DM object in the external storage device 140. In addition, the external storage device enabling module 130 can check the copy of the DM object in the external storage device 140, compare it with the DM object 120, and update the other based on the most recently changed one.

In this case, the operation of the external storage device enabling module 130 by the server 200 can be scheduled in a similar manner as mentioned above. For example, when a schedule of performing the DM command is matched, the external storage device enabling module 130 can perform the DM command to check whether it has been instructed in the SC node to copy the DM object 120 into the external storage device 140. If the DM object 120 has been instructed to be copied in the SC node, the external storage device enabling module 130 can copy the DM object 120 into the external storage device 140.

In addition, when the DM object 120 is checked to have been changed due to some reasons, the external storage device enabling module 130 can update the copy within the external storage device 140 according to the DM schedule. Herein, if the copy within the external storage device 140 has been changed, the external storage device enabling module 130 can update the DM object 120 in the terminal 100.

Meanwhile, when the external storage device 140 is replaced by a different one, the external storage device enabling module 130 can analyze the replaced external storage device and update the other based on one according to the analysis.

The external storage device enabling module 130 can perform setting of initial setting information, updating of persistent information, searching of management information in the terminal 100, and processing an event and alarm generated in the terminal 100.

The external storage device 140 can include a memory unit, namely, a smart card, an RFID, a flash memory, a NAND flash memory, etc., that can be detachably inserted in the terminal 100. The external storage device 140 can copy and store the DM object 120 within the terminal 100 according to a command from the server 200 or the user.

As shown in FIG. 3, the external storage device 140 can be expressed in a tree structure. The external storage device 140 may include an SC SyncML DM node, an SC Info node for indicating information of the external storage device, an SC Detail node for indicating detailed information of the external storage device, an SC Reporting node, a WAP node regarding WAP setting, an E-mail node for storing Emails, an MMS node for storing MMS messages that are transmitted and received, and a MO Copied node for indicating a copy of the DM object.

Up to now, the construction of the DM system according to the present invention has been described, in which the terminal 100 includes the DM enabling module 110, the DM object 120, the external storage device enabling module 130 and the external storage device 140, but the terminal may also include a combination of a processor (not shown), a network interface (not shown) and a storage device (not shown). In addition, the server 200 can be constructed in the same manner.

FIG. 4 is one exemplary view showing an operation of the terminal and the server in FIG. 1, and FIG. 5 is another exemplary view showing the operation of the terminal and the server in FIG. 1.

First, with reference to FIG. 4, it is shown that when the DM server 200 generates the DM object within the terminal 100, the DM object is coped to the external storage device. This operation will be described in detail as follows.

1) The DM server 200 generates a DM object suitable for the terminal 100 and determines whether to copy it.

2) In case that it is determined to copy the DM object to the external storage device, the DM server 200 transmits the generated DM object and a copying command to the terminal 100.

3) The DM enabling module 110 of the terminal 100 generates the received DM object in response to the DM object and copying command received from the server 200.

4) Thereafter, the DM enabling module 110 of the terminal 100 transfers the copying command to the external storage device enabling module 130.

5) The external storage device enabling module 130 copies the generated DM object in the external storage device 140 in response to the received command. In this case, the external storage device 140 after the DM object is copied can be as shown in FIG. 3.

FIG. 5 shows the operation that the DM server 200 copies the DM object previously stored in the terminal 100 to the external storage device 140. The operation will be described in detail as follows.

1) The DM server 200 determines whether to copy the DM object of the terminal 100 to the external storage device 140.

2) When the DM object of the terminal 100 is determined to be copied to the external storage device, the DM server 200 transmits a copying command to the terminal 100.

3) The DM enabling module 110 of the terminal 100 transfers the received copying command to the external storage device enabling module 130 in response to the copying command received from the server 200.

4) The external storage device enabling module 130 copies the DM object 120 to the external storage device 140 in response to the received command.

FIG. 6 is a flow chart illustrating the processes of a method for managing a DM object according to the present invention.

In detail FIG. 6 shows the DM object managing method in which when the external storage device 140 is mounted in the terminal 100, the DM object 120 within the terminal 100 and a DM object of the external storage device 140 are compared to update one of them.

In detail, when the external storage device 140 is mounted in the terminal 100, the external storage device 140 is analyzed (step S101).

And it is checked whether the DM object exists in the terminal 100 (step S102).

If the DM object 120 exists within the terminal 100, the DM object 120 of the terminal 100 is compared with the DM object within the external storage device 140 (step S103).

And then, one of the DM object within the external storage device 140 and the DM object 120 within the terminal 100 is updated according to the comparison result (step S104).

However, if the DM object 120 does not exist in the terminal 100, a user confirmation is selectively performed (step S105).

And the DM object within the external storage device 104 is copied into the terminal 100 (step S106).

Up to now, it has been described that the method can be implemented by software, hardware, or their combination. For example, the method according to the present invention can be implemented with codes or command within a software program that can be stored in a storage medium (e.g., an internal memory of the terminal, a flash memory, hard disk, etc.) and executed by a processor (e.g., a microprocessor within the mobile terminal).

As so far described, the DM system and the method for managing the DM object according to the present invention have many advantages.

That is, for example, because the DM object within the terminal can be copied to the external storage device, although the DM object within the terminal is unintentionally damaged, its copy version can be recovered.

In addition, although the user changes his/her terminal, he/she can use the changed terminal under the same conditions.

Also, because the DM object within the terminal and the copied version copied in the external storage device are compared and a relatively older one is updated based on the most recently changed one, the same DM object can be always maintained.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for managing a Device Management (DM) object, the method comprising:

detecting whether a memory card is mounted in a mobile communication terminal;

analyzing a DM object device in the memory card when memory card is mounted in the mobile communication terminal;

checking whether the DM object exists in the mobile communication terminal, wherein at least one DM object exists in a form of a DM tree;

selectively performing user confirmation when the DM object has not been stored in the mobile communication terminal;

copying the DM object of the memory card into the mobile communication terminal according to the user confirmation;

transmitting the DM object in the mobile communication terminal in form of the DM tree to a DM server;

receiving, from the server, information including a DM command for managing the DM object, a condition for performing the DM command, an updated DM object, wherein the information is stored in the mobile communication terminal in the form of the DM tree including a condition node corresponding to the condition, a commands node corresponding to the DM command, a Smart Card node indicating whether to copy the information into the memory card, and a gating node indicating whether to report the DM server;

checking whether the condition for performing the DM command is matched; performing the DM command to copy the updated DM object into the memory card when the condition is matched;

comparing the DM object in the memory card with the DM object in the mobile communication terminal; and coping the DM object in the memory card into the mobile communication terminal.

2. The method of claim 1, further comprising:

when it is checked that the DM object has been stored within the terminal, comparing the DM object within the memory card and the DM object within the mobile communication terminal; and updating one of the DM object within memory card and the DM object within the terminal.

3. A mobile communication terminal comprising:

a transceiver;

and a processor cooperating with the transceiver and configured to:

detect whether a memory card is mounted in the mobile communication terminal; analyze a DM object in the memory card when the memory card is mounted in the mobile communication terminal;

check whether the DM object exists in the mobile communication terminal, wherein at least one DM object exists in a form of a DM tree;

selectively perform user confirmation when the DM object has not been stored in the mobile communication terminal;

copy the DM object of the memory card into the mobile communication terminal according to the user confirmation;

transmit the DM object in the mobile communication terminal in form of the DM tree to a DM server;

receive, from the server, information including a DM command for managing the DM object, a condition for performing the DM command, an updated DM object, wherein the, information is stored in the mobile communication terminal in the form of the DM tree including a condition node corresponding to the condition, a commands node corresponding to the DM command, a Smart Card node indicating whether to copy the information into the memory card, and a gating node indicating whether to report the DM server;

check whether the condition for performing the DM command is matched; perform the DM command to copy the updated DM object into the memory card when the condition is matched;

compare the DM object in the memory card with the DM object in the mobile communication terminal; and copy the DM object in the memory card into the mobile communication terminal.

4. The mobile communication terminal of claim 3, wherein the DM object within the mobile communication terminal is sustained regardless of the existence of the copy version generated according to the copying.

5. The mobile communication terminal of claim 3, wherein, after the copying, when the DM object within the mobile communication terminal is deleted, the mobile communication terminal operates based on the copy version within the memory card.

6. The mobile communication terminal of claim 3, wherein the processor is further configured to store information regarding the copying in the DM object within the terminal.

* * * * *

UNITED STATES PATENT AND TRADEMARK OFFICE
CERTIFICATE OF CORRECTION

| | | |
|---|---|---|
| PATENT NO. | : 7,865,483 B2 | Page 1 of 1 |
| APPLICATION NO. | : 12/065518 | |
| DATED | : January 4, 2011 | |
| INVENTOR(S) | : Pablo Hernandez | |

It is certified that error appears in the above-identified patent and that said Letters Patent is hereby corrected as shown below:

ON THE TITLE PAGE:

Insert the following Item (60):

-- Related U.S. Application Data

(60) Provisional application No. 60/718,745, filed on Sep. 21, 2005. --

Signed and Sealed this
Third Day of May, 2011

David J. Kappos
*Director of the United States Patent and Trademark Office*